(12) United States Patent
Schlockermann et al.

(10) Patent No.: US 8,989,264 B2
(45) Date of Patent: Mar. 24, 2015

(54) MOVING PICTURE CODING APPARATUS AND MOVING PICTURE DECODING APPARATUS

(75) Inventors: Martin Schlockermann, Roedermark (DE); Bernhard Schuur, Mainz (DE); Shinya Kadono, Nishinomiya (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 551 days.

(21) Appl. No.: 13/397,128

(22) Filed: Feb. 15, 2012

(65) Prior Publication Data

US 2012/0147964 A1 Jun. 14, 2012

Related U.S. Application Data

(63) Continuation of application No. 12/774,957, filed on May 6, 2010, now Pat. No. 8,139,637, which is a continuation of application No. 10/488,474, filed as application No. PCT/JP03/08954 on Jul. 15, 2003, now Pat. No. 7,760,803.

(30) Foreign Application Priority Data

Jul. 15, 2002 (EP) ..................................... 02015606

(51) Int. Cl.
*H04N 7/12* (2006.01)
*G09G 5/36* (2006.01)
(Continued)

(52) U.S. Cl.
CPC ............. *H04N 19/433* (2013.01); *H04N 19/51* (2013.01); *H04N 19/61* (2013.01); *H04N 19/423* (2013.01); *H04N 19/428* (2013.01)
USPC ...................................... 375/240.12; 345/553

(58) Field of Classification Search
USPC .......................... 375/240.01–240.29; 345/553
See application file for complete search history.

(56) References Cited

U.S. PATENT DOCUMENTS 5,175,618 A 12/1992 Ueda et al.
5,317,397 A * 5/1994 Odaka et al. ............. 375/240.15
(Continued)

FOREIGN PATENT DOCUMENTS

JP 7-274174 10/1995
JP 8-298666 11/1996
(Continued)

OTHER PUBLICATIONS

L. Wang et al., "Interlace Coding Tools for H.26L Video Coding", ITU-Telecommunications Standardization Sector, Study Group 16 Question 6, Video Coding Experts Group (VCEG), 15$^{th}$ Meeting: Pattaya, Thailand, Document VCEG-037, ITU-T, Dec. 2001.
(Continued)

*Primary Examiner* — Gims Philippe
(74) *Attorney, Agent, or Firm* — Wenderoth, Lind & Ponack, L.L.P.

(57) ABSTRACT

A video encoder (70) for coding moving pictures comprising a buffer (16c) with a plurality of memory areas capable of storing frames composed of top fields and bottom fields, a motion estimation unit (19) operable to code, field by field, inputted pictures performing moving estimation and moving compensation by referring, field by field, to the picture data stored in a memory area, a motion compensation unit (16d), a subtractor (11), a transformation unit (13) and a quantization unit (14), a memory management unit (71) operable to manage, frame by frame, a plurality of memory areas, an inverse quantization unit (16a) and inverse discrete cosine transform unit (16b) operable to decode picture data in coded fields and store the picture data in the decoded field in any of the plurality of memory areas under the management by the memory management unit (71).

2 Claims, 17 Drawing Sheets

(51) Int. Cl.
*H04N 19/433* (2014.01)
*H04N 19/51* (2014.01)
*H04N 19/61* (2014.01)
*H04N 19/423* (2014.01)
*H04N 19/426* (2014.01)

(56) References Cited

U.S. PATENT DOCUMENTS

| | | | |
|---|---|---|---|
| 5,416,522 A * | 5/1995 | Igarashi | 375/240.15 |
| 5,576,765 A | 11/1996 | Cheney et al. | |
| 5,717,441 A | 2/1998 | Serizawa et al. | |
| 5,742,344 A | 4/1998 | Odaka et al. | |
| 5,798,788 A | 8/1998 | Meehan et al. | |
| 5,835,636 A | 11/1998 | Auld | |
| 5,929,915 A * | 7/1999 | Cho | 375/240.13 |
| 6,064,803 A | 5/2000 | Watabe et al. | |
| 6,088,391 A | 7/2000 | Auld et al. | |
| 6,249,318 B1 | 6/2001 | Girod et al. | |
| 6,356,317 B1 | 3/2002 | Watabe et al. | |
| 6,539,056 B1 | 3/2003 | Komori et al. | |
| 6,658,056 B1 | 12/2003 | Duruoz et al. | |
| 7,742,523 B2 | 6/2010 | Schlockermann et al. | |
| 7,760,803 B2 | 7/2010 | Schlockermann et al. | |
| 8,139,637 B2 | 3/2012 | Schlockermann et al. | |
| 2004/0008775 A1 | 1/2004 | Panusopone et al. | |
| 2004/0076236 A1 | 4/2004 | Duruoz et al. | |
| 2004/0190614 A1 | 9/2004 | Schlockermann et al. | |
| 2008/0062187 A1 | 3/2008 | Schlockermann et al. | |
| 2010/0215093 A1 | 8/2010 | Schlockermann et al. | |
| 2012/0144143 A1 | 6/2012 | Schlockermann et al. | |

FOREIGN PATENT DOCUMENTS

| | | |
|---|---|---|
| JP | 8-307875 | 11/1996 |
| JP | 10-117356 | 5/1998 |
| JP | 10-210484 | 8/1998 |
| JP | 11-004443 | 1/1999 |
| JP | 11-120690 | 4/1999 |
| JP | 11-136680 | 5/1999 |
| JP | 2000-41252 | 2/2000 |
| JP | 2001-128183 | 5/2001 |
| JP | 4440572 | 3/2010 |
| WO | 00/59219 | 10/2000 |

OTHER PUBLICATIONS

International Search Report issued Aug. 19, 2003 in corresponding International Application No. PCT/JP03/08954.
T. Fukuhara, entitled "Very Low Bit-Rate Video Coding With Blocking Partitioning and Adaptive Selection of Two Time-Differential Frame Memories", IEEE Transactions on Circuits and Systems for Video Technology, IEEE, Feb. 1997, vol. 7, No. 1, pp. 212-220.
Partial English translation for Japanese Unexamined Patent Application Publication No. 10-210484, published Aug. 7, 1998.
Supplementary European Search Report issued Mar. 10, 2010 in corresponding European Application No. 03 74 1394.
Peter Borgwardt, "Multi-picture Buffer Semantics for Interlaced Coding", Joint Video Team (JVT) of ISO/IEC MPEG & ITU-T VCEG(ISO/IEC JTC1/SC29/WG11 and ITU-T SG16 Q.6), No. JVT-0049, May 10, 2002, XP030005158.
Martin Schlockermann, "MMCO for interlaced sequences", Joint Video Team (JVT) of ISO/IEC MPEG & ITU-T VCEG(ISO/IEC JTC1/SC29/WG11 and ITU-T SG16 Q.6), No. JVT-D086, Jul. 26, 2002, XP030005360.

* cited by examiner

| Frame NO. | Used(1)/ Unused(0) | Long term area(1)/ Short term area(0) |
|---|---|---|
| ... | ... | ... |
| 12 | 1 | 0 |
| 13 | 0 | 0 |
| 14 | 1 | 1 |
| ... | ... | ... |

(b)

| Field NO. | Top(T)/ Bottom(B) | Used(1)/ Unused(0) | Long term area(1)/ Short term area(0) |
|---|---|---|---|
| ... | ... | ... | ... |
| 12 | T | 1 | 0 |
| 13 | B | | |
| 14 | T | 1 | 1 |
| 15 | B | | |
| 16 | T | 0 | 0 |
| 17 | B | | |
| ... | ... | ... | ... |

(c)

| Picture NO. | Frame(F)/ Field(T/B) | Used(1)/ Unused(0) | Long term area(1)/ Short term area(0) |
|---|---|---|---|
| ... | ... | ... | ... |
| 12 | F | 1 | 0 |
| 13 | T | 0 | 0 |
| 14 | B | | |
| 15 | T | 1 | 1 |
| 16 | B | | |
| ... | ... | ... | ... |

MOVING PICTURE CODING APPARATUS AND MOVING PICTURE DECODING APPARATUS

This application is a continuation of application Ser. No. 12/774,957, filed May 6, 2010 now U.S. Pat. No. 8,139,637, which is a continuation of application Ser. No. 10/488,474, filed Mar. 3, 2004, now U.S. Pat. No. 7,760,803, which is the National Stage of International Application No. PCT/JP2003/008954, filed Jul. 15, 2003.

TECHNICAL FIELD

The present invention relates to memory management control of a multi frame buffer used to store reference picture data in video coding and decoding, and particularly to a memory management method for interlaced video data.

BACKGROUND ART

Moving pictures are used in an increasing number of applications in fields ranging from video telephony and video conferencing to DVD and digital television. In order to transmit moving pictures, it is necessary to transmit an enormous volume of data via an existing transmission channel in which an effective frequency bandwidth is limited. When digital data is transmitted within a limited transmission band, it becomes an absolute necessity to compress or reduce the volume of data to be transmitted.

For the purpose of enabling inter-operability between video data in a plurality of systems dedicated to applications which were designed by different manufacturers, video coding standards have been developed for compressing the volume of video data in a common method. Such video coding standards include H.261 and H.263 developed by ITU, and MPEG-1, MPEG-2, and MPEG-4 developed by ISO/IEC.

A basic approach to coding taken by many of the above standards is comprised of the following major stages:

1. dividing each picture into blocks made up of pixels so as to enable processing to be performed at a block level on pictures that constitute video. A picture refers to a frame or fields;
2. reducing spatial redundancy in a picture by performing transformation, quantization, and entropy coding on video data in one block; and
3. Coding a difference between consecutive frames, utilizing correlation between the consecutive pictures.

The above is achieved by the use of a motion estimation and compensation technique. In order to estimate, on a block-by-block basis, a motion vector indicating predictive image data which indicates a strong correlation between frames, an encoder performs motion estimation to search the coded frames for a position of image data indicating a strong correlation. Furthermore, the encoder and the decoder perform motion compensation to extract predictive image data with respect to the motion vector.

FIG. 1 shows an example configuration of a video encoder (moving picture coding apparatus). The video encoder illustrated in the diagram is comprised of: a transform unit 13 operable to transform spatial video data into a frequency domain; a quantization unit 14 operable to quantize the transform coefficients obtained by the transform unit 13; a variable length coding unit 15 operable to perform entropy coding on the quantized transform coefficients; a video buffer 17 for supplying a transmission channel with compressed video data at a variable bit rate depending on a transmission rate; a decoder 16, and a motion estimation unit 19.

Video data 10 from the encoder shown in FIG. 1 is inputted in a form of pixel values using pulse-code modulation (PCM). A subtractor 11 calculates a differential value between the video data 10 and a motion-compensated image 12. The motion-compensated image 12 is obtained as a result of decoding an already coded image and performs motion compensation on the resultant ("a current decoded picture"). This is carried out by a decoder 16 in pairs with the video encoder. The decoder 16 performs the coding procedure in an inverse order. Stated another way, the decoder 16 is comprised of an inverse quantization unit (Q-1), an inverse discrete cosine transform unit (IDCT), and an adder for adding a decoded difference and a motion-compensated image so as to generate a preceding picture which is equivalent to the one obtained at the decoder's side.

In motion-compensated coding, motion-compensated data in a current picture is generated, based on motion estimation which has been performed on such picture and a decoded picture, from picture data derived from the corresponding decoded picture. A motion predicted value is represented by a two-dimensional motion vector indicating a pixel displacement between the decoded picture and the current picture. Usually, motion estimation is performed on a block-by-block basis. Stated another way, a block in the decoded picture which is most strongly correlated with a block in the current frame is regarded as a motion-compensated image. The motion estimation unit 19 operable to perform such motion estimation and a motion compensation unit MC operable to generate a motion-compensated image from the picture which has been decoded corresponding to the motion vector are incorporated into the encoder.

The video encoder illustrated in FIG. 1 operates in the following manner. The video image of the video signal 10 is divided into a group of a certain number of small blocks generally called macro block. For example, a video image 20 shown in FIG. 2 is divided into a plurality of macro blocks 21. Generally, each of the macro blocks has a size of 16×16 pixels.

Furthermore, a picture is divided into a certain number of slices 22. Each slice is made up of a plurality of macro blocks and serves as a unit of alignment recovery at the time of data loss. Note that an arrangement of macro blocks that constitute a slice is not necessarily made up of macro blocks in the same row as shown in FIG. 2, and therefore that it is also possible that a slice includes macro blocks in a plurality of rows and there is a delimiter of another slice in the middle of the row.

When image data in video is coded by just reducing the volume of spatial redundancy in the image, the resultant picture is called I picture. An I picture is coded with reference to only pixel values in the picture. The data size of a coded I picture is large because temporal information used to reduce the volume of data cannot be used for an I picture.

With the aim of performing an efficient compression utilizing temporal redundancy between consecutive pictures, prediction coding is performed on the consecutive pictures on the basis of motion estimation and motion compensation. When a reference picture selected in motion estimation is one picture which has been already coded and decoded, it is called P picture. Meanwhile, when two pictures are reference pictures (usually, forward and backward pictures in display order with respect to a current picture), they are called B picture.

According to the H.26L standard on a picture coding method under development, motion compensation for each of 16×16 macro blocks can be carried out by using a different block size. Each motion vector can be determined with respect to a block with a size of 4×4, 4×8, 8×4, 8×8, 8×16, or 16×16 pixels. The effect of using a smaller block size for motion compensation is that it becomes possible to describe detailed motions.

Based on the result of motion estimation, estimation is performed on a determined motion vector as motion compensation. Subsequently, information included in a prediction error block obtained from the predicted block is transformed into transform coefficients in the transformation unit 13. Generally, two-dimensional Discrete Cosine Transform (DCT) is employed. Such obtained transform coefficients are quantized, and entropy coding (VLC) is performed on the resultant by the entropy coding unit 15 in the end. Note that a motion vector calculated by the motion estimation unit 19 is used for motion compensation and is incorporated into compression video data 18 via the variable length coding unit 15 and the video buffer 17.

A transmission stream of the compressed video data 18 is transmitted to the decoder (picture decoding apparatus), where a sequence of coded video images is reproduced on the basis of the received data. The configuration of the decoder pairs with that of the decoder 16 included in the video encoder shown in FIG. 1.

In a new video coding method, it is possible to use a plurality of bi-directionally predictive pictures so as to realize more efficient picture coding. For this reason, a motion estimation unit and a motion compensation unit include multi frame buffers for providing a variety of reference pictures. Information indicating individual reference image is added to a motion vector.

The internal structure of a multi frame buffer is as shown by FIG. 3, and the figure with a reference number 30 shows the whole structure. The multi frame buffer is composed of a plurality of memory areas 31 and 32 for storing frames of the video signal. The memory areas in the multi frame buffer 30 are divided into two different kinds of memory areas, that is, a short term picture memory area 33 mainly for storing reference pictures used as a reference picture for a short term and a long term picture memory area 34 mainly for storing reference pictures used as a reference picture for a long term.

The multi frame buffer stores reference pictures selected as appropriate so as to code or decode special pictures. The procedure for storing reference pictures is divided into two processing stages, that is, (1) a stage of realigning reference pictures and (2) a stage of buffering reference pictures.

(1) The reference pictures are aligned based on the reference picture order information to be transmitted in the slice layer. Ordering reference pictures has influence on the coding or decoding processing of a group of macro blocks included in one slice. The aim of this processing is to reduce the number of bits of information that indicates a reference picture to be referred to at the time of motion compensation by assigning a smaller number to a picture to be frequently referred to, in other words, by assigning a reference number with a shorter signal length to a picture with a smaller number.

(2) As for buffering reference pictures, buffering pictures to be coded or decoded is controlled when updating reference pictures stored in the multi frame buffer for each coding or decoding processing.

With the aim of buffering reference pictures, one of the two different kinds of memory management control mode, that is, "a shift window buffering mode" or "adaptive memory control buffering mode" can be used.

In the shift window buffering mode, the pictures as targets of each coding or decoding are stored in the multi frame buffer. The picture in the short term picture memory area of the multi frame buffer is periodically replaced by a new picture in a First-In First-Out (FIFO) method. There is no need to delete any picture data so as to store pictures under processing as long as the buffer has sufficient capacity of an unused memory area. If the unused area of the multi frame buffer becomes full with new picture data that have already been processed, the stored picture data are being replaced by picture data of new pictures under coding or decoding in the order of storage.

In the adaptive memory control buffering mode, they are stored in the multi frame buffer, or each picture to be deleted from the place is explicitly selected. Memory control is performed according to the memory management control processing parameter that enables memory management control in the coding side and the decoding side that are correlated with each other. In order to perform replacement processing of such pictures, a unique identification number for explicitly specifying a picture to be coded or decoded is assigned to each memory area. Note that an index indicating the picture order after realigning reference pictures of the above-mentioned (1) is assigned to each memory area, and the index is called reference index.

Several problems are left in the above memory management control mode. In the conventional memory management control mode, it is impossible to efficiently process especially interlace video data. The interlace video data comprises frames composed of two fields (a top field and a bottom field), each of which has different time and a different vertical spatial location. Pictures may be coded field by field, which leads to a problem of making memory management complicated.

SUMMARY OF THE INVENTION

Therefore, an object of the present invention is to provide a moving picture coding apparatus, a moving picture decoding apparatus, a memory management device and the like that make it possible to efficiently perform picture memory management in coding and decoding on interlace video data.

In order to achieve the above-mentioned object, the moving picture coding apparatus concerning the present invention comprises: a memory unit with a plurality of memory areas capable of storing frames composed of top fields and bottom fields; a coding unit operable to code, field by field, inputted pictures, with performing motion estimation and motion compensation by referring, field by field, to the picture data stored in the memory areas; a memory management unit operable to manage, frame by frame, the plurality of memory areas; and a storage unit operable to decode field picture data coded by the coding unit and store the decoded field picture data in any of the plurality of memory areas under management of the memory management unit.

Also, the moving picture decoding apparatus concerning the present invention comprises: a memory unit with a plurality of memory areas capable of storing frames composed of top fields and bottom fields; a decoding unit operable to decode, field by field, inputted pictures, with performing motion compensation by referring, field by field, to the picture data stored in the memory areas; a memory management unit operable to manage, frame by frame, the plurality of the memory areas; and a storage unit operable to store the picture data in the field decoded by the decoding unit in any of the plurality of the memory areas under the management of the memory management unit.

Further, the memory management device concerning the present invention is a memory management device in the moving picture coding or decoding apparatus, comprising: a memory unit with a plurality of memory areas capable of storing frames composed of top fields and bottom fields, a management unit operable to manage, frame by frame, the plurality of the memory areas, and a memory access unit operable to store/read out fields in/from any of the plurality of the memory areas under management of the management unit.

These moving picture coding apparatus, moving picture decoding apparatus and a memory management device always perform memory management frame by frame irrespective of which unit of frame and field is used when storing picture data to each memory area capable of storing one frame data or two field data (a top field data and a bottom field data) and reading out the picture data from each of the memory areas, and thus memory management in coding and decoding interlace video data becomes simpler and more efficient. Especially, when both pictures coded frame by frame and pictures coded field by field are included in the interlace video data, efficient memory management is realized because only memory control on the basis of a frame unified as the unit is required.

Here, the memory management unit manages the picture data in each of the above-mentioned plurality of the memory areas frame by frame so as to grasp whether they can be stored or not, and the storage unit may store the field in the memory areas specified as storable by the memory management unit. In other words, the memory management unit manages the memory areas by setting the storaged flag associated with each of the above-mentioned plurality of the memory areas as "used" or "unused", and the storage unit may store the field in the memory areas specified as "unused" by the storaged flag. For example, the memory management unit sets the storaged flag associated with the memory area as "used" when storing the frame, a top field or a bottom field in the memory area, and sets the storaged flag associated with the memory are as "unused" when no picture data is stored in the memory area, the stored frame becomes useless, or both of a top field and a bottom field become useless. By doing so, 1 bit of storaged flag is assigned to the memory area that stores two field data, only judging or changing the condition of the 1 bit storaged flag enables the management of whether picture data is storable in each memory area or not, which makes it possible to simplify the processing concerning the management and reduce the required memory capacity for management.

Also, the memory management unit may manage whether each of the plurality of the memory areas is "short term picture memory area" for short term reference or "long term picture memory area" for long term reference frame by frame. In other words, the memory management unit may manage the memory area by setting long term flags associated with each of the plurality of the memory areas as "short term picture memory area" or "long term picture memory area". For example, the memory management unit sets the long term flag as "long term picture memory area" when changing frames, top fields or bottom fields stored in the memory area for which the long term flag is set as "short term area". By doing so, 1 bit of long term flag is assigned to the memory area that stores two field data, only judging or changing the condition of the 1 bit long term flag enables the management of the reference attributes ("for short term reference" or "for long term reference") of each memory area, which makes it possible to simplify the processing concerning the management and reduce the required memory capacity for management. Further, only changing the long term flag from "short term picture memory area" to "long term picture memory area" enables the picture data stored in the short term picture memory area to be transmitted to the long term picture memory area.

Note that the present invention can also be realized as a moving picture coding method, a moving picture decoding method, a memory management method, a program, a computer-readable storage medium where the program is stored besides the moving picture coding apparatus, moving picture decoding apparatus and memory management device mentioned earlier.

Further Information about Technical Background to This Application

European Patent application No. 02015606.3, field Jul. 15, 2002 is incorporated herein by reference.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 8A shows an example of video signals to be coded frame by frame;

FIG. 8B shows an example of video signals to be coded field by field; and

FIG. 8C shows an example of a video signal to be coded in a state where both frames and fields are included.

FIG. 10 is a table showing an example of memory management by the memory management unit;

FIG. 10A shows an example of memory management in association with FIG. 8A;

FIG. 10B shows an example of memory management in association with FIG. 8B; and FIG. 10C shows an example of memory management in association with FIG. 8C.

FIG. 11A shows the storage condition of a buffer when a video signal to be inputted is coded frame by frame;

FIG. 11B shows the storage condition of a buffer when a video signal to be inputted is coded field by field; and FIG. 11C shows the storage condition of a buffer when a video signal to be inputted is coded in a state where both frames and fields are included.

DETAILED DESCRIPTION OF THE INVENTION

First Embodiment

Figure 1:
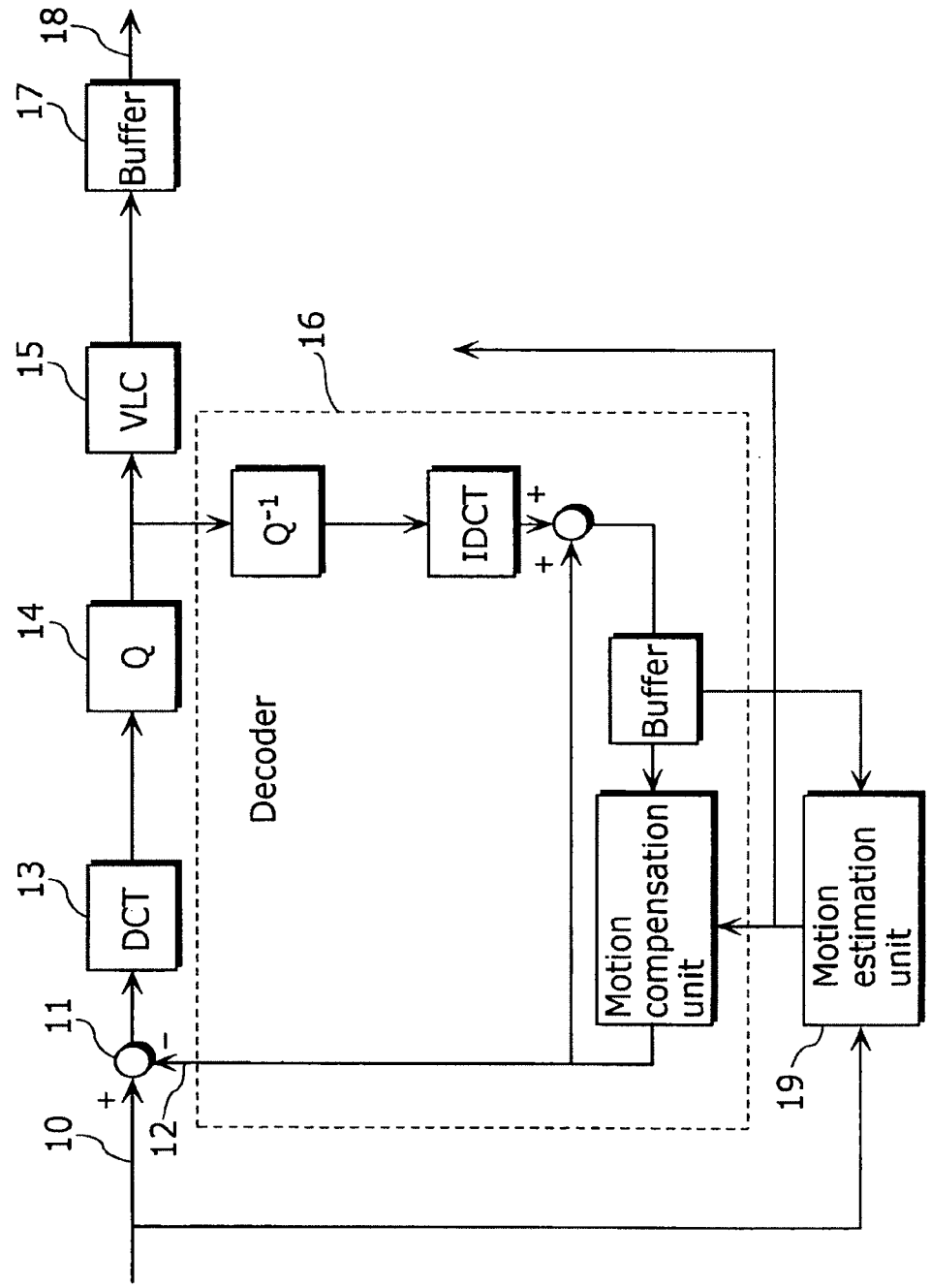
FIG. 1 is a block diagram of a DPCM video encoder on which motion compensation is performed.
Figure 2:
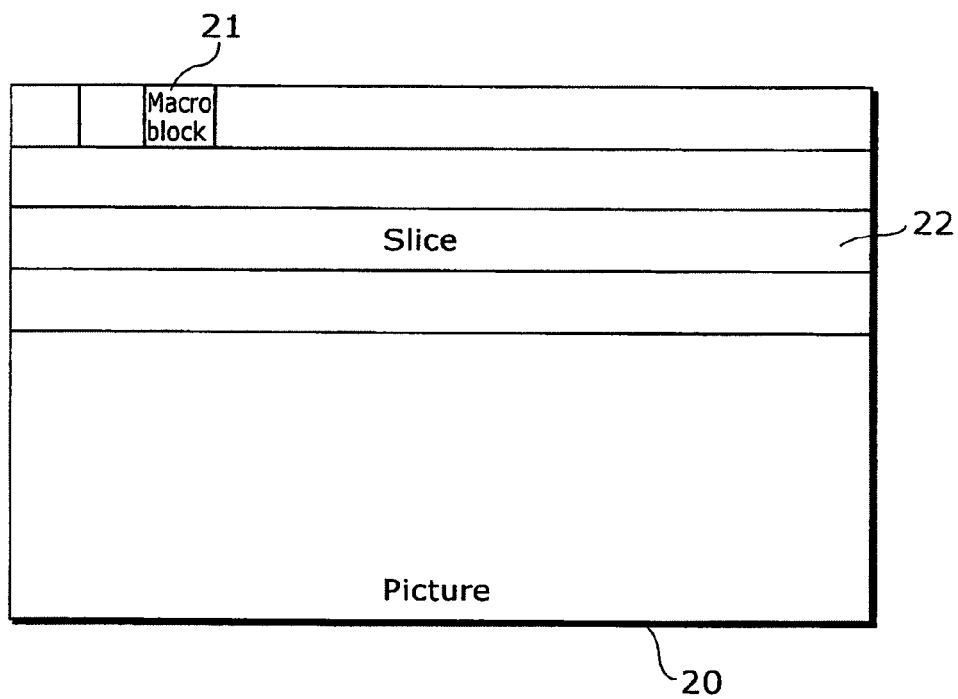
FIG. 2 shows a subdivision of a video picture for coding and decoding processing.

Explanation on a video encoder (a moving picture coding apparatus) in the first embodiment of the present invention will be made below with reference to figures. Note that the video encoder in the present embodiment has a configuration shown in FIG. 1 and a characteristic memory management function shown in the later-explained FIG. 5. Different points from the conventional video encoder will be focused on in the explanation below.

Figure 3:
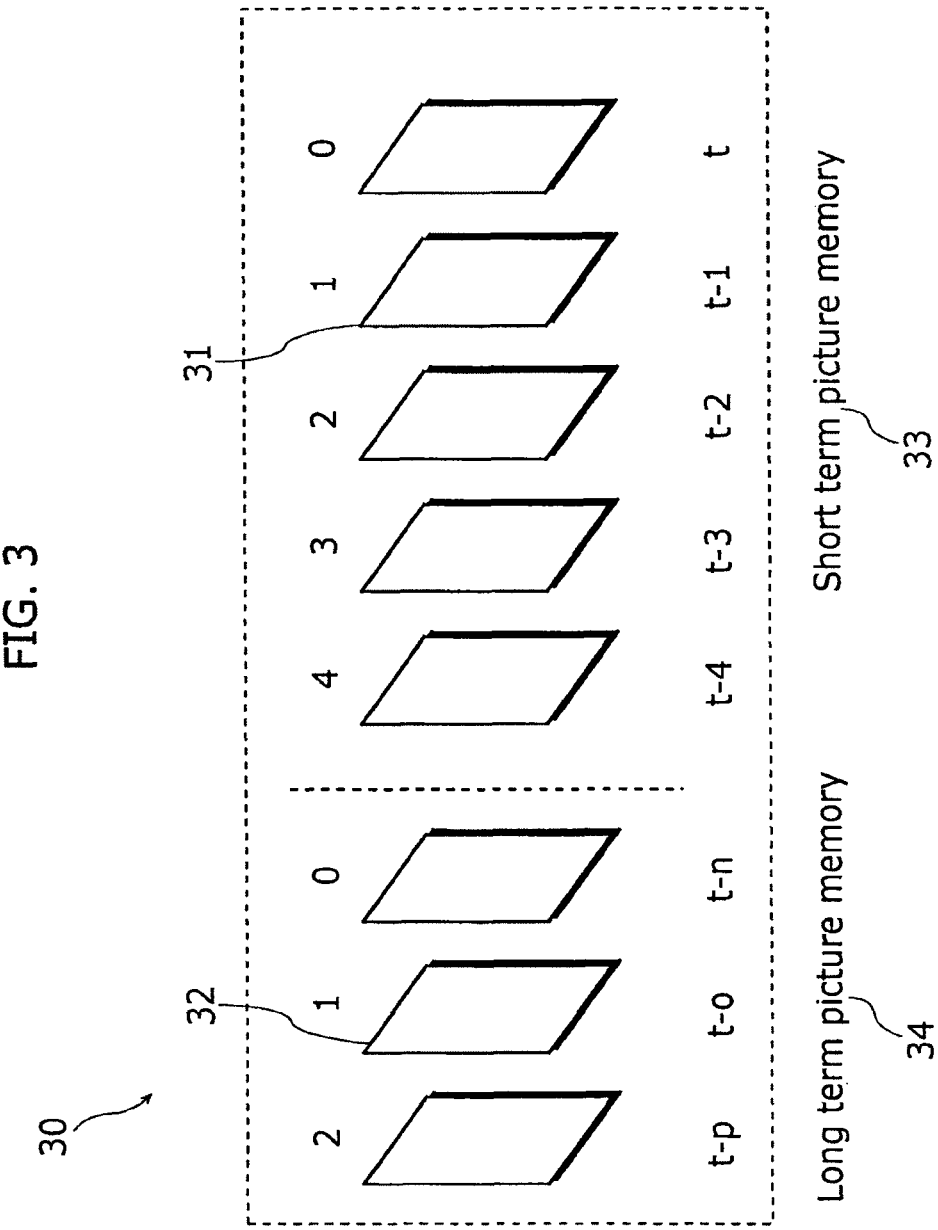
FIG. 3 shows the whole structure of a multi frame buffer used for motion estimation and motion compensation.
Figure 4:
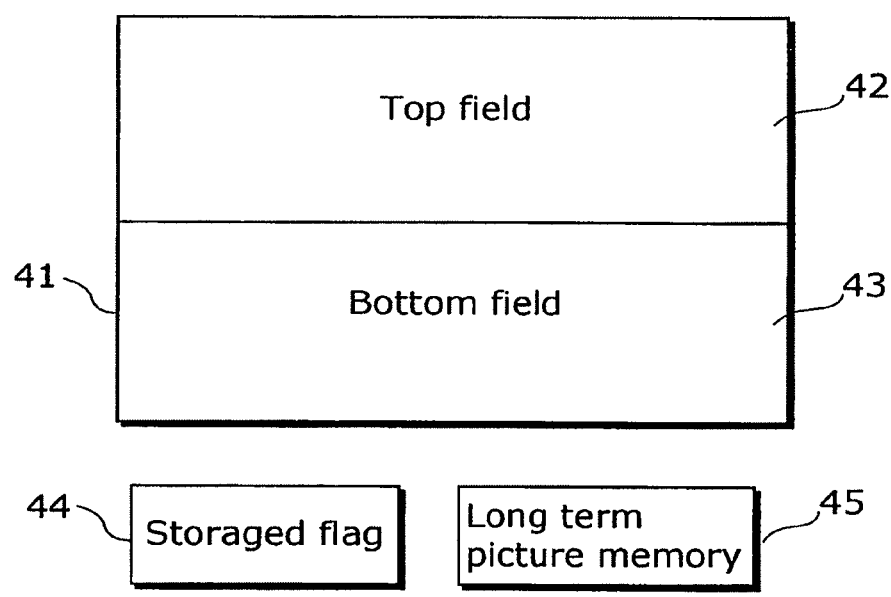
FIG. 4 shows data stored in association with one memory area.

As shown above, FIG. 3 shows the whole structure of a multi frame buffer. The multi frame buffer 30 has a plurality of memory areas 31 and 32 for storing reference pictures composed of two fields, that is, a top field and a bottom field. The data stored respectively in the memory areas 31 and 32 is as shown in FIG. 4. Each memory area 41 is used for storing a top field 42 and a bottom field 43. Each field data is independently written in or read out from the memory area.

Figure 5:
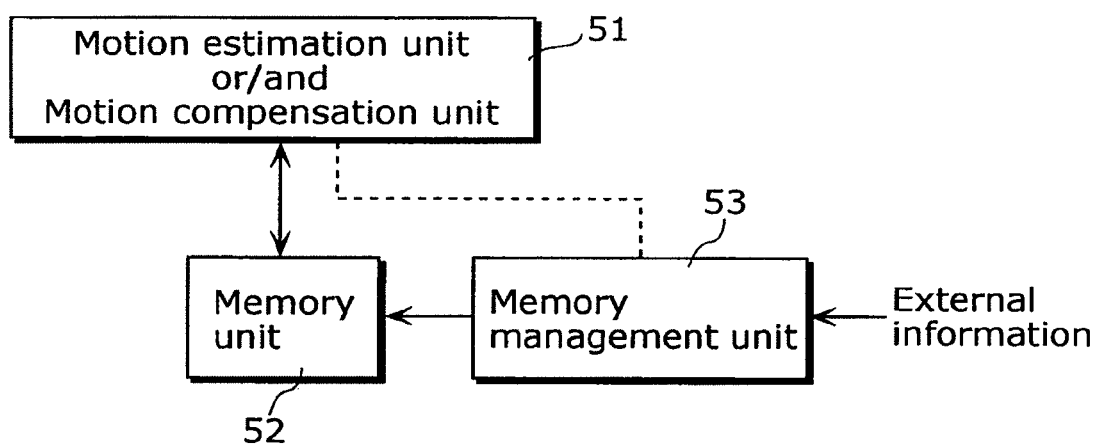
FIG. 5 shows a block diagram of a motion estimation and/or motion compensation unit.

A memory management unit 53 shown in FIG. 5 generates reference pictures appropriate for motion estimation and motion compensation. When finishing coding and decoding each picture, a memory unit (multi frame buffer) 52 is updated according to the memory control information. The memory area used for storing new pictures such as picture data to be coded or decoded is marked by setting a storaged flag 44 assigned to each memory area one by one. The reference pictures necessary for motion estimation or motion compensation of a series of pictures are held in a frame buffer by canceling these storaged flags. When deleting pictures from the memory unit (multi frame buffer) 52, the storaged flag 44 is set as "unused". The storaged flag 44 turns into a use state when either one of a field of a frame, both fields and a frame is set. The storaged flag 44 shows the state of a frame, what is stored there is managed memory (field) by memory. When only a kind of field, that is, a top field or a bottom field is stored there, it is possible to show that the other kind of field can be stored.

The storaged flag can be stored in the memory unit (multi frame buffer) 52 or, instead of it, the memory management unit 53 associated with a memory area corresponding to a multi frame. Associating a storaged flag 44 with a pair of a top field and a bottom field eliminates the addition of any hardware for processing interlace video data.

Further, a long term flag 45 may be assigned to each memory area 41. This flag 45 is stored in the memory management unit 53 associated with the memory unit (multi frame buffer) 52 or each memory area. Using this long term flag 45 shows that each memory area is stored in a long term reference picture. In this way, setting a long term flag 45 realizes a shifting processing of pictures from the short term picture memory area 33 to the long term picture memory area 34.

Note that the long term picture memory area 34 stores a top field or a bottom field in either a top and bottom field locations 42 or 43 in the embodiment of the present invention, which realizes efficient improvement in storing long term picture data. This is achieved by setting two storaged flags for each long term picture memory area that makes it possible to show that each field location is "unused".

Figure 6:
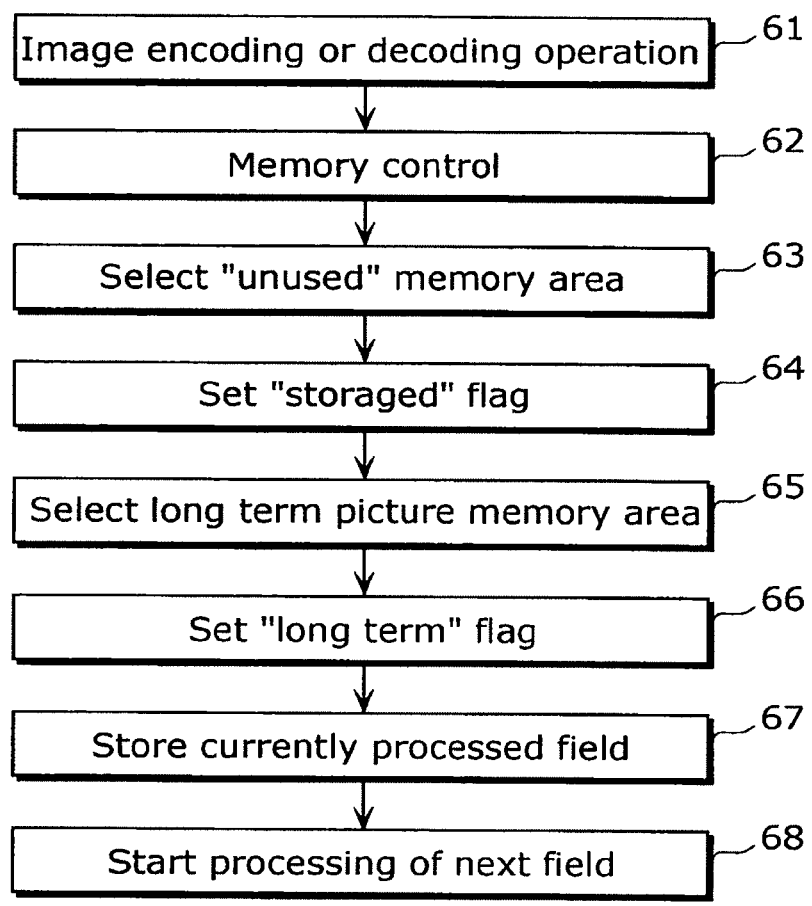
FIG. 6 shows an example of control method of a multi frame buffer.

The example method of the memory management control is shown in FIG. 6. When finishing coding or decoding pictures in the step 61, as shown in the step 62, memory control processing for a multi frame buffer is started. In the step 63, a memory area which stores two fields unnecessary for later field processing is selected first, next to this, the storaged flag 44 is set as "unused" in the step 64. When there is a memory area storing a kind of field data that composes the same frame and the other field area in the memory area is "unused", the other field data may be stored in the unused field area. For example, when top field data of the same frame has already been stored in the memory area and the bottom field data has not been stored yet, the bottom field may be stored in the unused bottom field area of the memory area.

In this way, it becomes possible to write in new picture data in each memory space of a pair of unused fields. This selection is made based on the memory control information sent from the video encoder. The video encoder can generate control information based on the definition in the employed coding standard.

Further, the memory control information selects a memory area that has long term picture data (step 65). After that, long term flags 45 in these memory areas are set in the step 66.

In the step 67, fields to be processed are stored in each "unused" field location of the memory area according to a memory control parameter, after that, coding or decoding processing is resumed in the step 68.

As shown above, the present invention relates to motion estimation and motion compensation unit using a plurality of reference pictures, and the plurality of reference pictures are stored in the memory unit with a memory area of each reference picture. Each memory area stores video data of a frame including a top field and a bottom field. Storage of video data to the memory unit is controlled by the memory management unit. A storaged flag that permits storing video data of the two consecutive fields in a memory area is assigned to each memory area. By doing so, coding, decoding, motion estimation and motion compensation of pictures are performed field by field or frame by frame when the video signal is interlace video data, but management of the memory unit (management of "used" or "unused" and the like) is performed frame by frame, which simplifies the processing of memory management.

Note that the storaged flag 44 and the long term flag 45 are explained at the same time in the first embodiment, it is also possible to use only one of those flags or employ another method.

Second Embodiment

Next, a video encoder and a video decoder in the second embodiment of the present invention will be explained. The present embodiment is a detailed version of the first embodiment, and it is the same as the first embodiment in that memory management is performed frame by frame.

Figure 7:
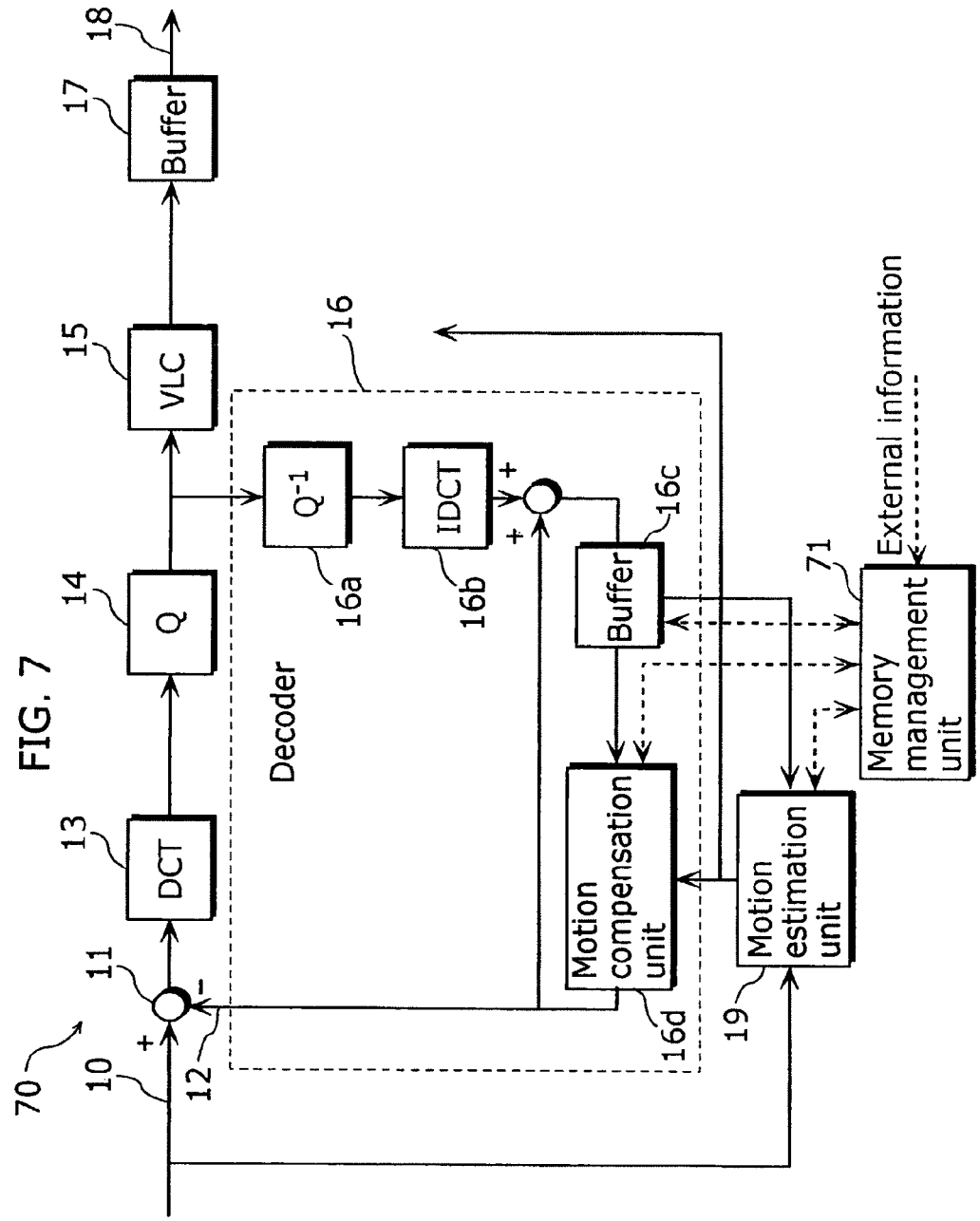
FIG. 7 is a block diagram showing the structure of a video encoder in the second embodiment.

FIG. 7 is a block diagram showing the structure of a video encoder 70 in the second embodiment. The feature of this video encoder 70 is that memory management to a multi frame buffer is performed frame by frame even when the structure of the inputted video signal 10 and the unit for coding is frame by frame, field by field or a mixture of those. The video encoder 70 comprises a to subtractor 11, a transform unit 13, a quantization unit 14, a variable length coding unit 15, a video buffer 17, a decoder 16, and a motion estimation unit 19 and a memory management unit 71. The decoder 16 comprises an inverse quantization unit 16a, an inverse discrete cosine transform unit 16b, a buffer 16c and a motion compensation unit 16d. Note that the same number is assigned to the same component as the one of the conventional video encoder shown in FIG. 1 and the video encoder in the first embodiment, and the explanations on these components are omitted.

Figure 8:
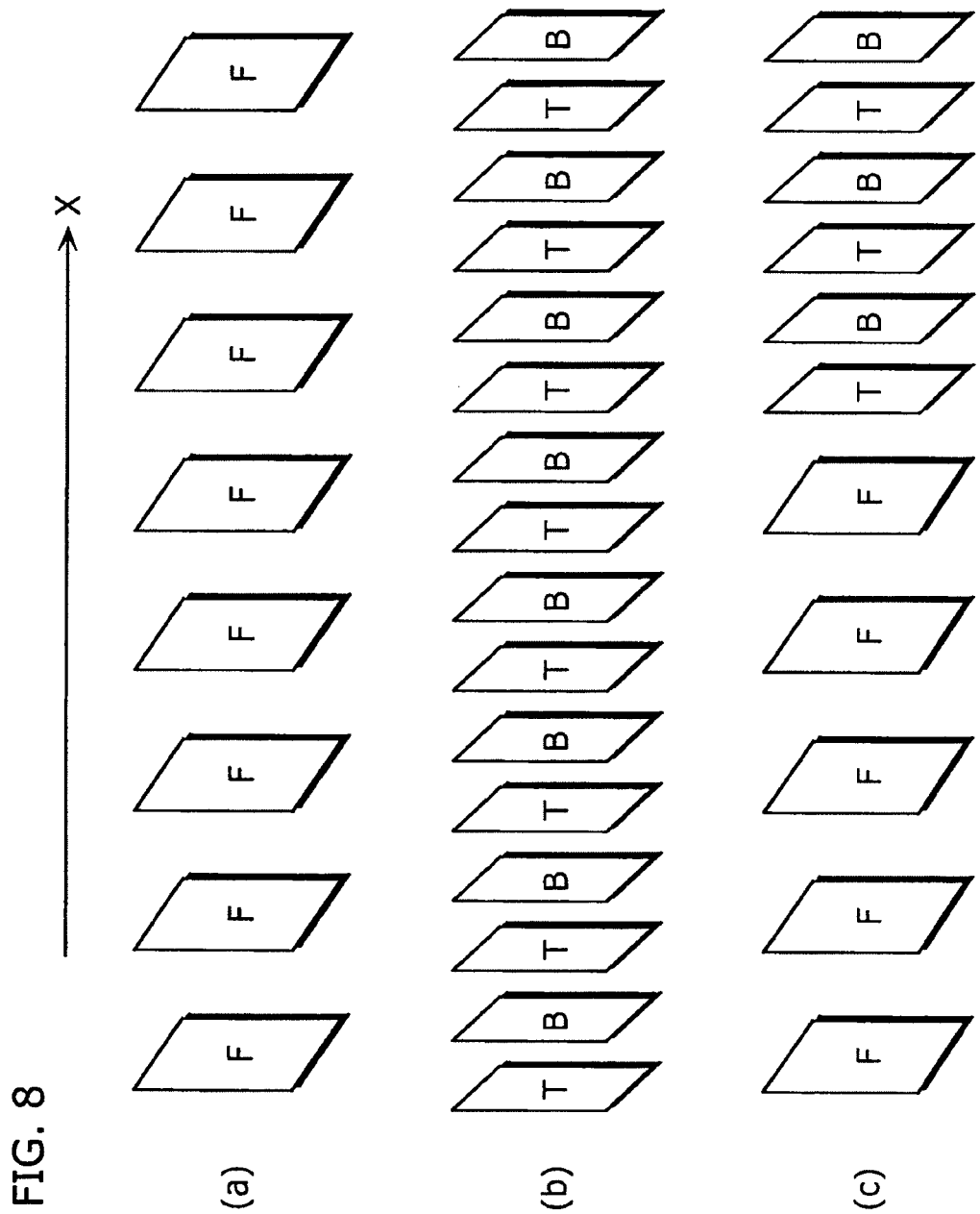
FIG. 8 is a diagram showing the kinds of video signals to be inputted or units for coding.

The video encoder 70 of this embodiment has a characteristic memory management unit 71. This memory management unit 71 orders the motion compensation unit 16d and the motion estimation unit 19 to select the same unit for processing as the unit based on the external information showing which unit (frame by frame, field by field or a mixture of these units) is used when coding the pictures of the inputted video signal 10 and manages reference pictures stored in a multi frame buffer, that is, the buffer 16c frame by frame. For example, as shown in FIG. 8A, when pictures of the inputted video signal 10 are coded frame by frame in GOP (Group Of Picture or sequence), it controls the motion compensation unit 16d and the motion estimation unit 19 to process pictures frame by frame and performs memory management frame by frame. On the other hand, as shown in FIG. 8B, when the pictures of the inputted video signal 10 are coded field by field in GOP (or sequence) or the like, it controls the motion compensation unit 16d and the motion estimation unit 19 to process pictures field by field and performs memory management frame by frame. Further, as shown in FIG. 8C, when the pictures of the inputted video signal 10 are coded under the condition where both frames and fields are included for every GOP (or sequence), it controls the motion compensation unit 16d and the motion estimation unit 19 to process pictures frame by frame or field by field according to the unit operable to code in this case and performs memory management frame by frame.

Note that the details of the memory management are basically the same as the first embodiment. Here, one bit of storaged flag and one bit of long term flag are assigned to every memory area that is a unit operable to store one frame data or two field data (top field data and bottom field data), the condition of "used" or "unused" and the storage area of "long term" or "short term" are judged and recorded for every picture data (every frame or every pair of a top field and a bottom field in this embodiment). These flags are set in the buffer 16c or the memory management unit 71. Note that "unused" shows that it is possible to store picture data (frame data, top field data or bottom field data) in the corresponding memory area, and that "used" shows that it is prohibited that the picture data be stored. Also, "long term picture memory area" and "short term picture memory area" corresponds to each area in the case of dividing the buffer 16c into two kinds of storage areas, that is, a storage area mainly for long term reference and a storage area mainly for short term reference respectively.

Figure 9:
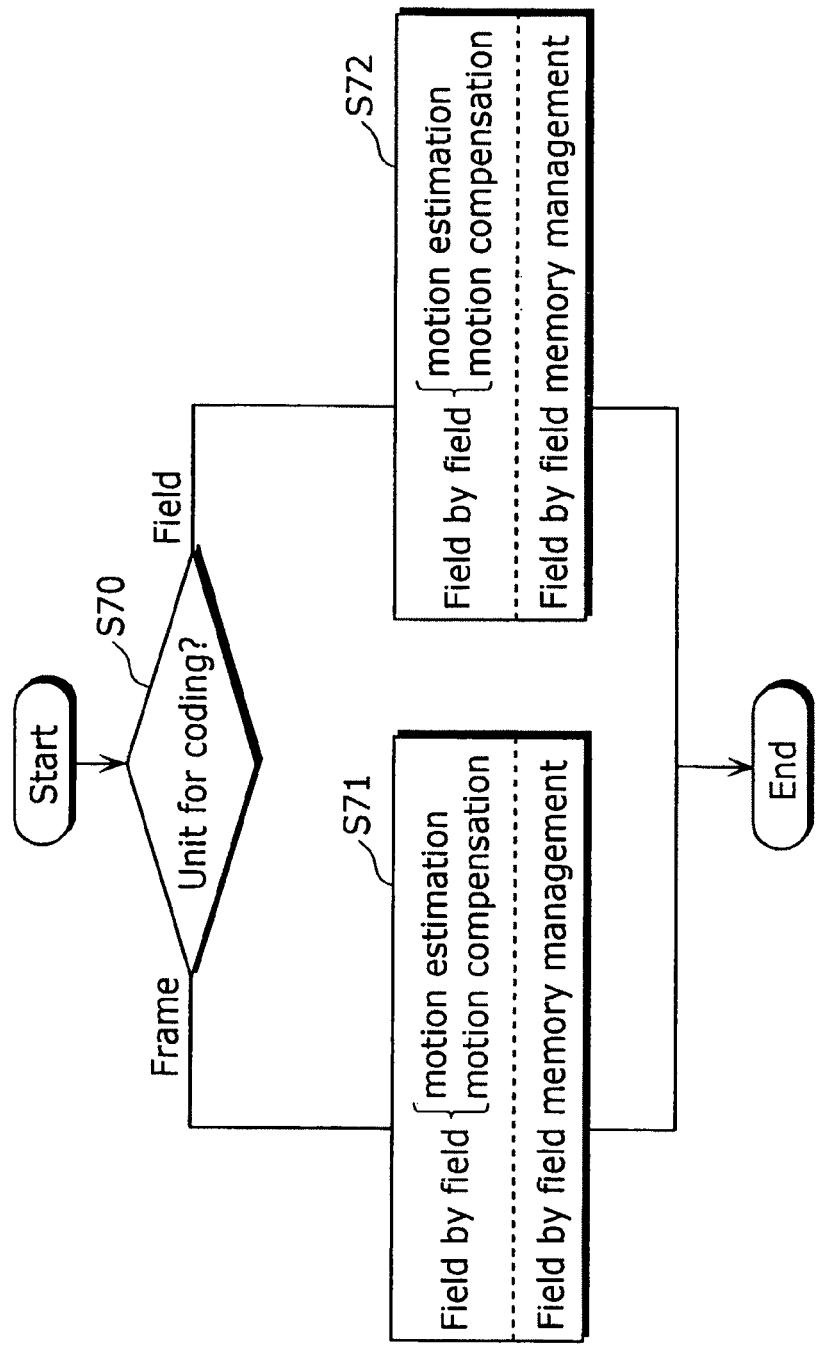
FIG. 9 is a flow chart showing the operational procedure of a memory management unit.

FIG. 9 is a flow chart showing the operational procedure of the memory management unit 71. The memory management unit 71 judges the unit operable to code the video signal 10 to be inputted based on the inputted external information (step S70). When the pictures of the video signal 10 are coded frame by frame ("frame by frame" in the step S70), the memory management unit 71 controls the motion compensation unit 16d to perform motion compensation frame by frame and the motion estimation unit 19 to perform motion estimation frame by frame, and it stores or eliminates the reference pictures in or from the buffer 16c frame by frame and stores them in the long term picture memory area or the short term picture memory area (step S71). On the other hand, when the pictures of the video signal 10 are coded field by field ("field by field" in the step S70), the memory management unit 71 controls the motion compensation unit 16d to perform motion compensation field by field and the motion estimation unit 19 to perform motion estimation field by field, it stores or eliminates the reference pictures in or from the buffer 16c frame by frame and stores them in the long term picture memory area or the short term picture memory area (step S72).

FIG. 10 is a table showing an example of memory management by the memory management unit 71. When the inputted video signal 10 is coded frame by frame, using the storaged flag and long term flag corresponding to every frame (that is, memory area) enables the memory management unit 71 to record, refer to or update the state of "used" or "unused" as to every frame and which area of "long term picture memory area" or "short term picture memory area" is used for storage as shown in FIG. 10A.

On the other hand, when the inputted video signal 10 is coded field by field, using the storaged flag and long term flag or the like corresponding to every pair of a top field and a bottom field (that is, memory area) enables the memory management unit 71 to record, refer to or update the state of "used" or "unused" as to every frame and which area of "long term picture memory area" or "short term picture memory area" is used for storage as shown in FIG. 10B. This detailed procedure is as shown in the flow chart of FIG. 6 in the first embodiment.

Further, when the inputted video signal 10 is coded using both frame and field as the unit, using a storaged flag and a long term flag or the like corresponding to every frame as to frames and a storaged flag and a long term flag or the like corresponding to every pair of a top field and a bottom field as to fields enables the memory management unit 71 to record, refer to or update the state of "used" or "unused" as to every frame and which area of "long term picture memory area" or "short term picture memory area" is used for storage for every frame or for every pair of a top field and a bottom field, that is, frame by frame as shown in FIG. 10C.

Here, specific control procedure of storaged flags are as follows: when picture data has not been stored in the memory area yet, when frame data stored in the memory area become unnecessary (when they are determined to be not used), or when both of top field data and bottom field data stored in the memory area become unnecessary (both of field data are determined to be not used), the storaged flags corresponding to the memory area are set as "unused". Doing so enables storing new frame data or field data in the memory area.

On the other hand, when storing new frame data, top field data or bottom field data in the "unused" memory area, the storaged flag corresponding to the memory area is set as "used". By doing so, it is prohibited that other frame data or field data be stored in the memory area, and it is made certain that frame data or field data that have already been stored are to be held in the memory area. When top field data or bottom field data are stored in the "unused" memory area, the storaged flag corresponding to the memory area is set as "used", but it manages data of the bottom field and top field that composes the same frame regarding them as storable respectively in either one of the field areas or the other field area of the memory area.

Also, specific control procedure of long term flags are as follows: when using picture data stored in the memory area for short term reference, the short term flags corresponding to the memory area are set as the "short term picture memory area", the picture data being the frame data when frame data are stored, the top field data when only top field data are stored, the bottom field data when only bottom field data are stored, or both the top field data and the bottom field data when top field data and bottom field data are stored. By doing so, it becomes possible to use the memory area as a buffer memory of FIFO along with the memory area of other "short term picture memory area".

On the other hand, when using picture data stored in the memory area for long term reference, the long term flags corresponding to the memory area are set as the "long term picture memory area", the picture data being the frame data when frame data are stored, the top field data when only top field data are stored, the bottom field data when only bottom field data are stored, or both the top field data and the bottom field data when top field data and bottom field data are stored. By doing so, it is made sure that the picture data are stored in the memory area until they are explicitly eliminated from the memory area (become "unused"). Also, when changing the frames, top fields or bottom fields that are stored in the memory area where long term flags are set as "short term picture memory area" into flags for long term reference, the long term flag should be set as the "long term picture memory area". Doing so makes it possible to easily shift the picture data from the "short term picture memory area" to the "long term picture memory area".

Figure 11:
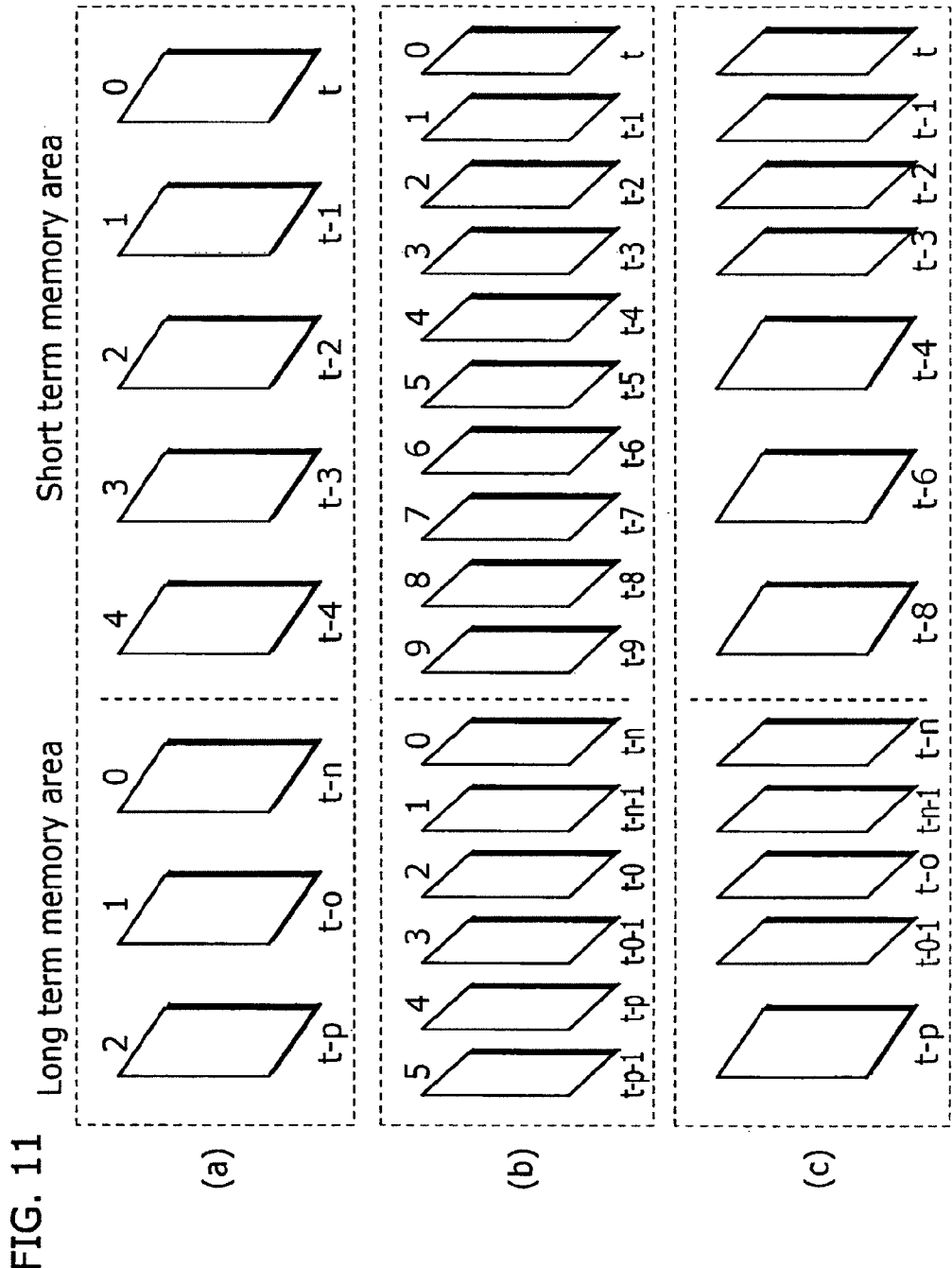
FIG. 11 is a diagram showing the storage condition of the reference picture in a buffer.

FIG. 11 is a diagram showing the storage condition of the reference pictures in a buffer. FIG. 11A shows the storage condition of the buffer 16c in the case where the video signal 10 to be inputted is coded frame by frame, FIG. 11B shows the storage condition of the buffer 16c in the case where the video signal 10 to be inputted is coded field by field, and FIG. 11C shows the storage condition of the buffer 16c in the case where the video signal 10 to be inputted is coded under the condition that both frames and fields are included.

As shown above, the video encoder 70 in the embodiment performs memory management frame by frame in any case where the unit operable to code the inputted video signal 10 is frame by frame, field by field, or a mixture of those. Therefore, compared to a complicated memory management method under the condition that both a frame and a field are used as the unit, a processing load for memory management is reduced and a circuit size for it is downsized.

Figure 12:
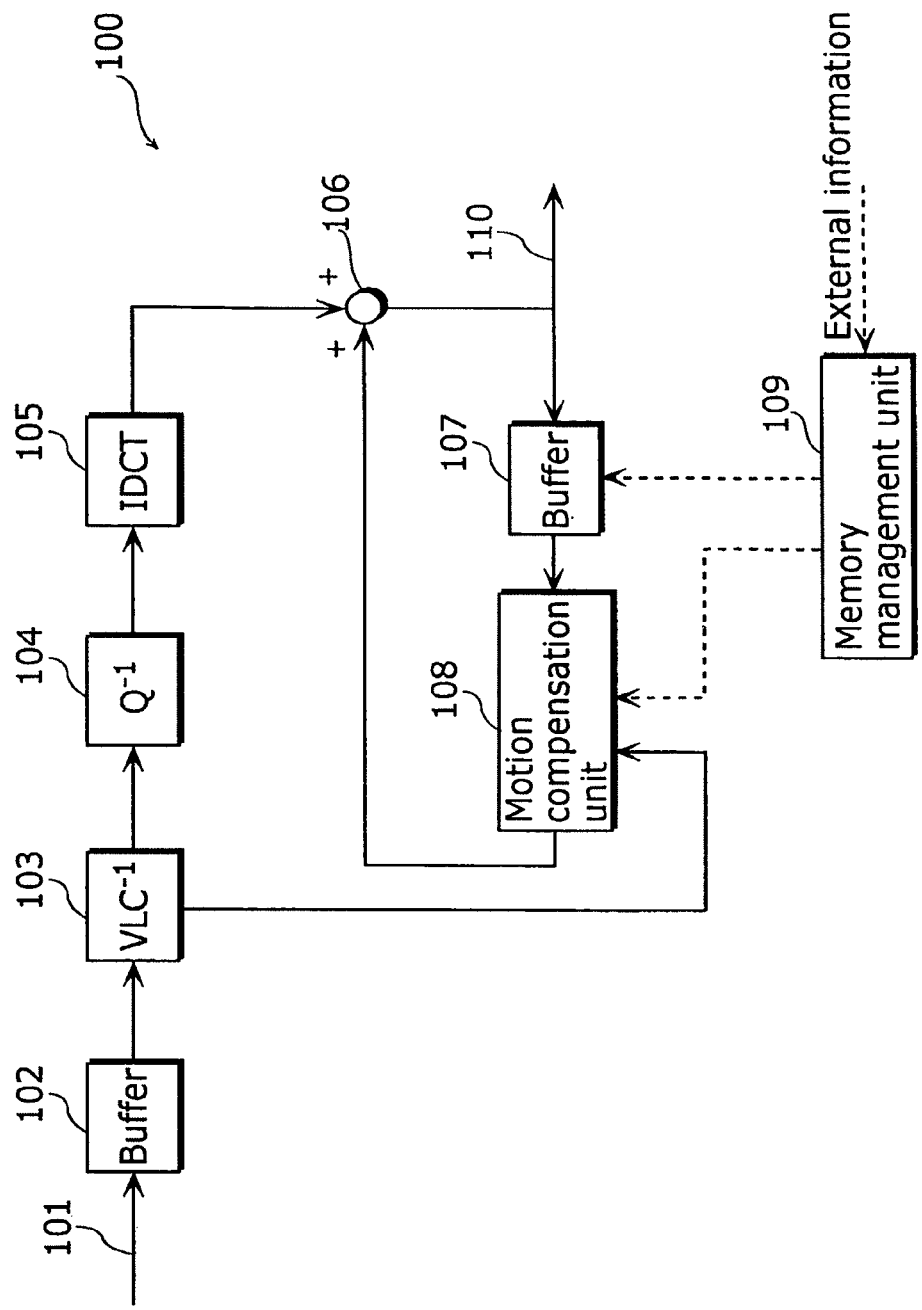
FIG. 12 is a block diagram showing the structure of the video decoder concerning the present invention.

The memory management unit 71 in the embodiment can be applied not only for a video encoder but also for a video decoder (moving picture decoding apparatus). FIG. 12 is a block diagram showing the structure of the video decoder 100 with the memory management unit 109 with the same function as the above-mentioned memory management unit 71. The video decoder 100 comprises an input buffer 102 for saving the inputted coded video signal 101, a variable length decoding device 103 for decoding corresponding to the coding by the variable length coding unit 15 equipped in the video encoder 70, an inverse quantization unit 104 operable to perform inverse quantization corresponding to the quantization by the quantization unit 14 equipped in the video encoder 70, an inverse discrete cosine transform unit 105 operable to perform inverse transform to the transformation performed by the transformation unit 13 equipped in the video encoder 70, an adder 106 for outputting the video signal 110 by adding pictures, a buffer 107 as a multi frame buffer for storing reference pictures, a motion compensation unit 108 operable to perform motion compensation on the reference pictures stored in the buffer 107 using the motion vectors, which are contained in the coding video signal 101, obtained through the variable length decoding device 103, and the memory management unit 109.

The memory management unit 109 orders the motion compensation unit 108 to select the same unit for processing based on the external information indicating which unit (frame by frame, field by field) is used in coding the pictures of the inputted coding video signal 101 and manages the reference pictures stored in a multi frame buffer, that is, the buffer 107 frame by frame. More specifically, when the pictures of the inputted coded video signal 101 are coded frame by frame in GOP (or sequence) or the like, the memory management unit 109 controls the motion compensation unit 108 to perform motion compensation frame by frame, and it performs memory management frame by frame. On the other hand, when the pictures of the inputted coded video signal 101 are coded field by field in GOP (or sequence), the memory management unit 109 controls the motion compensation unit 108 to perform motion compensation field by field, and it performs memory management frame by frame. Details on the memory management by this video decoder 100 are the same as the one by the video encoder 70 except that motion compensation is performed using motion vectors contained in the inputted coded video signal 101.

Up to this point, two embodiments of a moving picture coding apparatus, a moving picture decoding apparatus and a memory management concerning the present invention have been explained, and this present invention is not limited to these embodiments.

There is no need to equip both the storaged flag 44 and the long term flag 45 like this embodiment, in other words, it is possible to use only one of them or employ another method.

Further, it is possible to perform memory management frame by frame or field by field in a mixed manner instead of only frame by frame in a fixed manner when considering that improving the function of a memory management and the efficiency in using a buffer frame outweigh simplifying memory management. For example, it is possible to perform management on "used"/"unused" frame by frame and on "short term picture memory area"/"long term picture memory area" field by field by assigning 1 bit of storaged flag and 2 bits of long term flag to each of the memory areas.

Memory management ("used"/"unused", "long term picture memory area"/"short term picture memory area") is realized by using flags corresponding to pictures (frames or fields) in the above-mentioned embodiment, the present invention is not limited to memory management where flags are used. For example, it is also possible to perform similar memory management by making a management table where picture numbers of pictures (or reference indexes or numbers showing each areas of a buffer) in a state of "used" (or "unused") are selected from the pictures stored in the buffer are recorded or a management table where picture numbers of pictures (or reference indexes or numbers showing each areas of a buffer) stored in a "short term picture memory area" (or "long term picture memory area") are recorded.

Also, it is possible to realize the video encoder and the video decoder that equip a memory management function shown in the above-mentioned embodiment as a program. Distributing such a program after recording it on a storage medium such as a flexible disc makes it possible to make general-purpose computers in every places function as a video encoder or a video decoder concerning the present invention.

Figure 13:
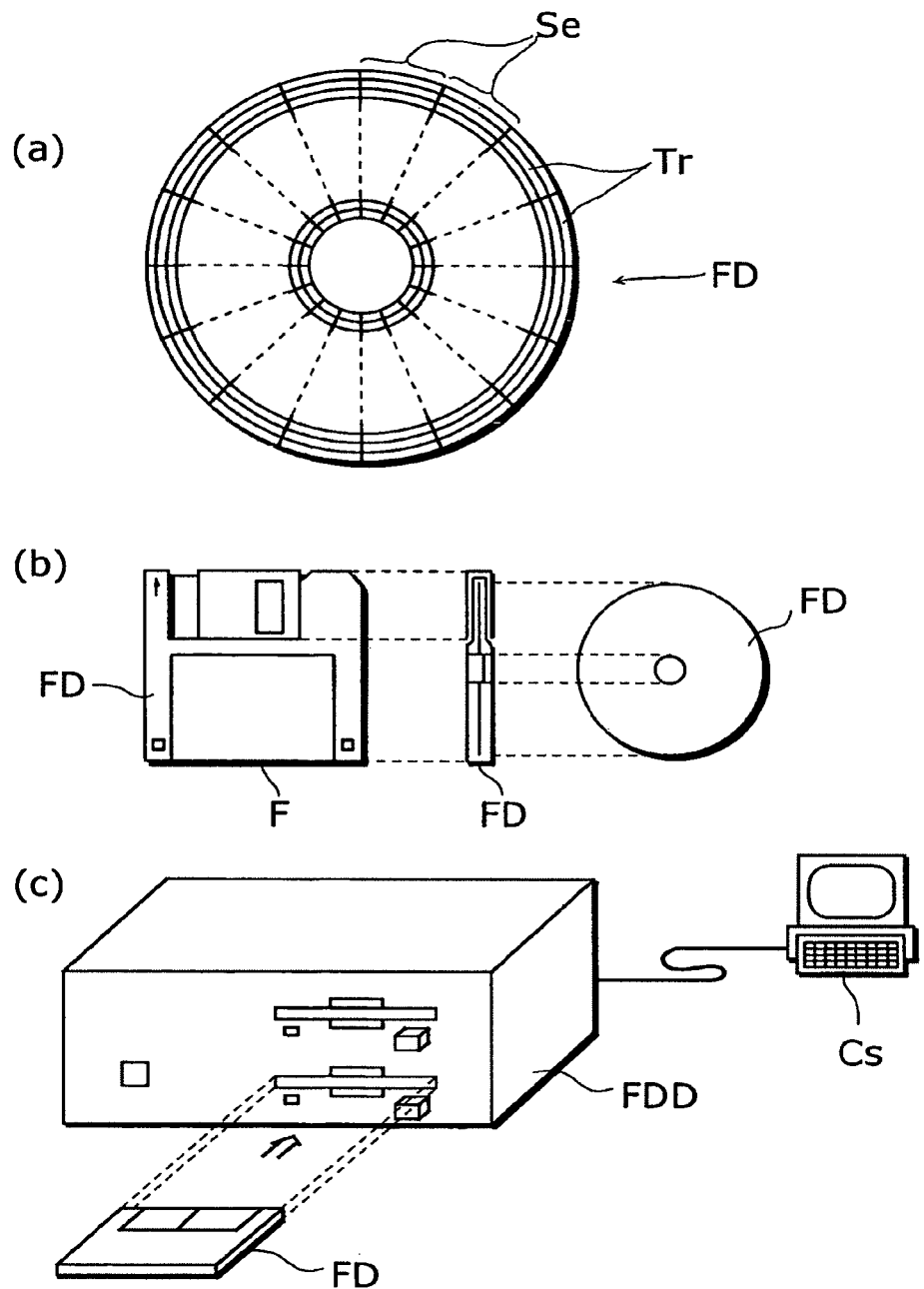
FIG. 13 is an illustration concerning the storage medium for storing a program for realizing the video encoder and the video decoder concerning the present invention in a computer system.

FIG. 13 is an illustration of a storage medium for storing a program for realizing the video encoder and the video decoder of the above-mentioned embodiment using a computer system. FIG. 13A shows an example of a physical format of a flexible disc as a recording medium body. FIG. 13B shows a flexible disc and the front view and the cross-sectional view of the appearance of the flexible disc. A flexible disc (FD) is contained in a case F, a plurality of tracks (Tr) are formed concentrically on the surface of the disc from the periphery into the inner radius of the disc, and each track is divided into 16 sectors (Se) in the angular direction. Therefore, in the case of the flexible disc storing the above-mentioned program, the video encoder and the video decoder as the program is recorded in an area allocated for it on the flexible disc (FD). Also, FIG. 13C shows the structure for recording and reading out the program on the flexible disc (FD). When the program is recorded on the flexible disc (FD), the computer system (Cs) writes in the video encoder or the video decoder as a program via a flexible disc drive. When the video encoder and the video decoder mentioned above are constructed in the computer system by the program on the flexible disc, the program is read out from the flexible disc through a flexible disc drive and transferred to the computer system. Note that the recording medium is not limited to flexible discs, and optical discs such as DC-ROMs and DVD-ROMs, memory cards, ROM cassettes and the like can also be used.

Also, the video encoder and the video decoder concerning the present invention can be applied for various kinds of apparatuses or systems. Applications of the video encoder and the video decoder in the above-mentioned embodiment will be explained below.

Figure 14:
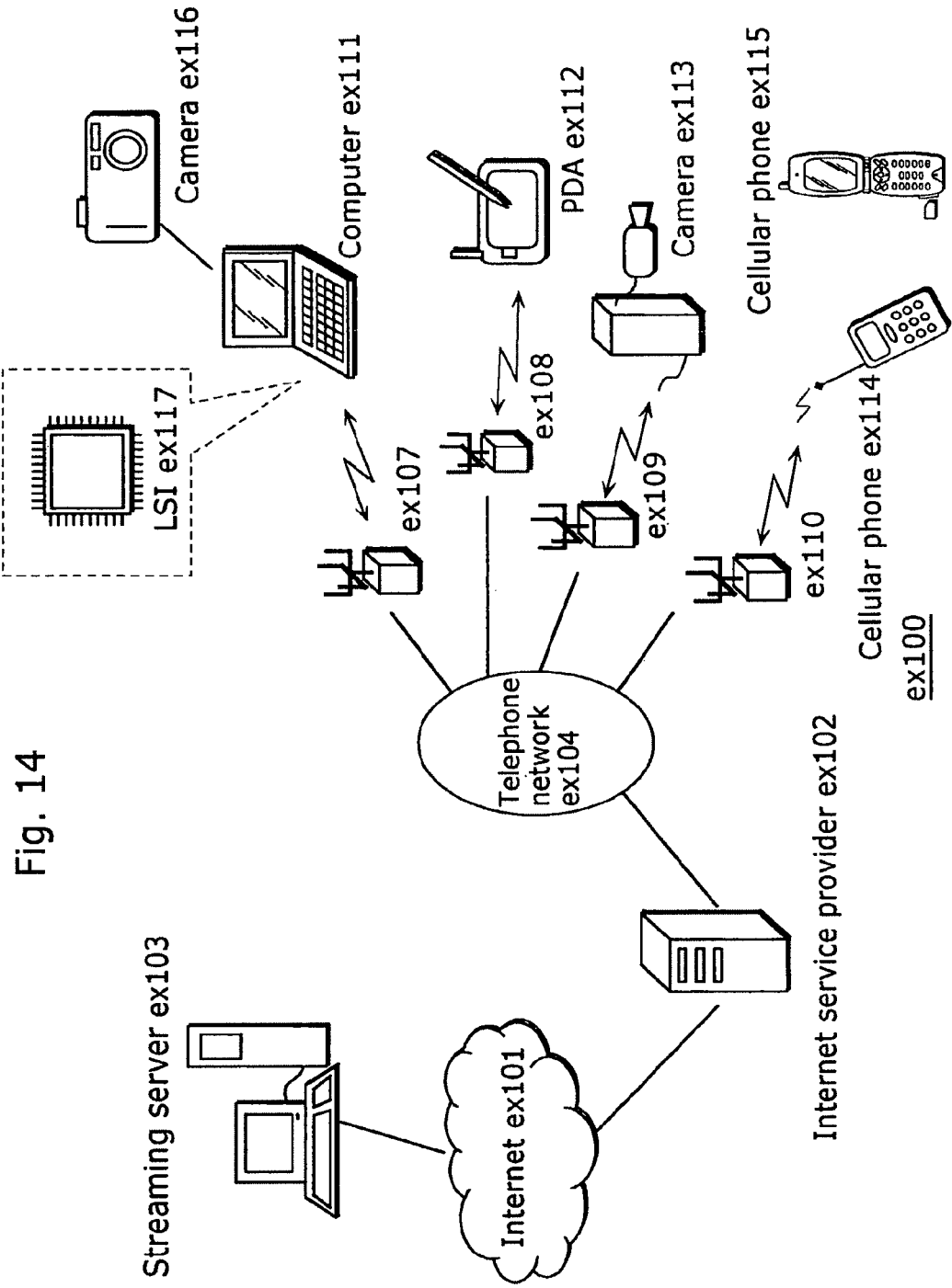
FIG. 14 is a block diagram showing the whole structure of a content supply system that realizes a content distribution service concerning the present invention.

FIG. 14 is a block diagram showing the overall configuration of a content supply system ex100 for realizing content distribution service. The area for providing communication service is divided into cells of desired sizes, and cell sites ex107 to ex110 of fixed wireless stations are placed in the respective cells. This content supply system ex100 is connected to each apparatus such as a computer ex111, a Personal Digital Assistant (PDA) ex112, a camera ex113, a cellular phone ex114 and a cellular phone with a camera ex115 via, for example, a combination of the Internet ex101, an Internet service provider ex102, a telephone network ex104 and cell sites ex107 to ex110. However, the content supply system ex100 is not limited to the configuration as shown in FIG. 14, and may be connected to a combination of any of them. Also, each apparatus can be connected directly to the telephone network ex104, not through the cell sites as fixed radio stations ex107 to ex110.

The camera ex113 is an apparatus capable of shooting video (moving pictures) such as a digital video camera. The cell phone can be a cell phone of a Personal Digital Communications (PDC) system, a Code Division Multiple Access (CDMA) system, a Wideband-Code Division Multiple Access (W-CDMA) system or a cellular phone using a Global System for Mobile Communications (GSM) system, a Personal Handy-phone system (PHS) or the like.

A streaming server ex103 is connected to the camera ex113 via the cell site ex109 and the telephone network ex104, which enables live distribution or the like using the camera ex113 based on the coded data transmitted from the user. Either the camera ex113 or the server for transmitting the data can code the shot data. Also, the moving picture data shot by a camera ex116 can be transmitted to the streaming server ex103 via the computer ex111. The camera ex116 is an apparatus capable of shooting still and moving pictures such as a digital camera. In this case, either the camera ex116 or the computer ex111 can code the moving picture data. An LSI ex117 included in the computer ex111 or the camera ex116 performs coding processing. Software for coding and decoding pictures can be integrated into any type of storage media (such as CD-ROMs, flexible discs, hard discs and the like) that is a recording medium which is readable by the computer ex111 or the like. Furthermore, a cellular phone with a camera ex115 can transmit the moving picture data. This moving picture data is the data coded by the LSI included in the cellular phone ex115.

The contents supply system ex100 codes contents (such as a music live video) shot by users using the camera ex113, the camera ex116 or the like in the same manner as the above-mentioned embodiments and transmits them to the streaming server ex103, while the streaming server ex103 makes stream distribution of the contents data to the clients upon their request. The clients include the computer ex111, the PDA ex112, the camera ex113, the cellular phone ex114 and so on that are capable of decoding the above-mentioned coded data. In this way, the contents supply system ex100 enables the clients to receive and reproduce the coded data, and further to receive, decode and reproduce the data in real time so as to realize personal broadcasting.

When each apparatus in this system performs coding or decoding, the video encoder or the video decoder can be used, as shown in the above-mentioned embodiments.

Figure 15:
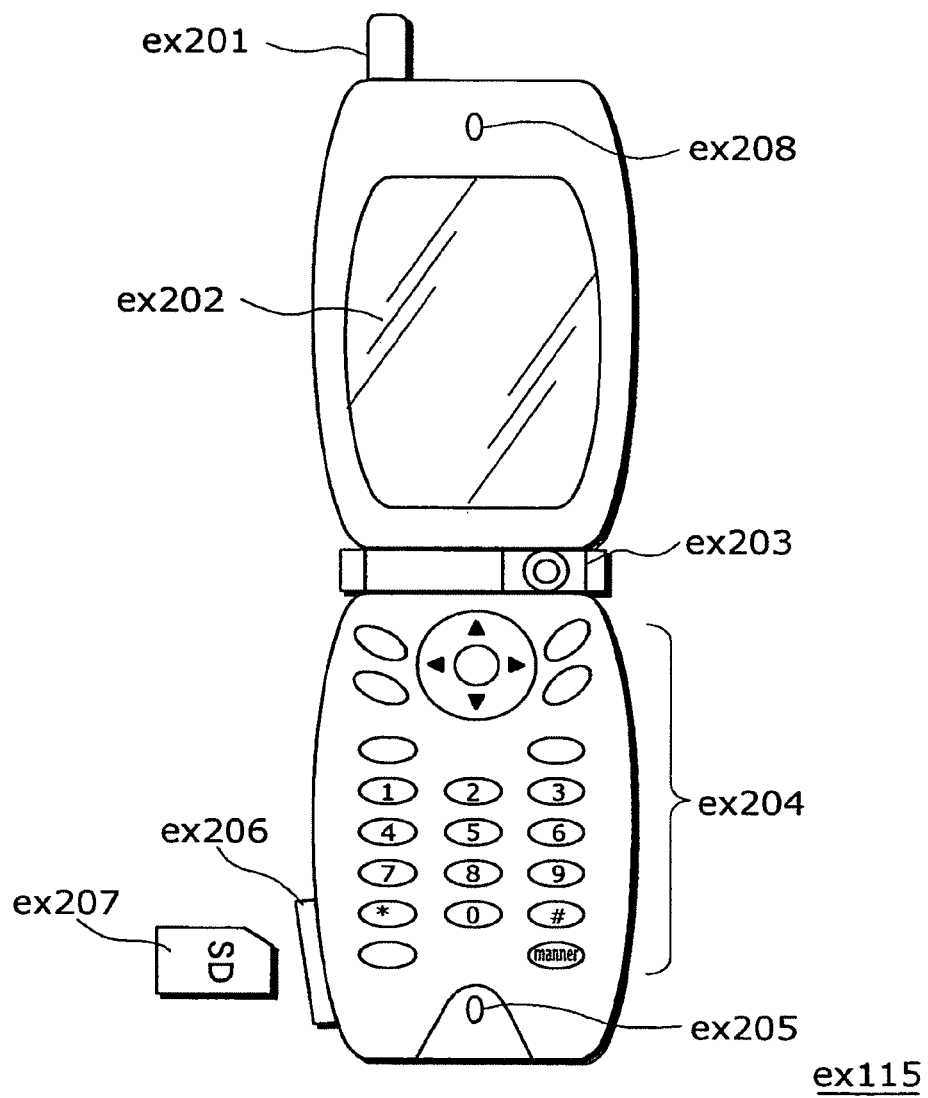
FIG. 15 is a diagram showing an example of a cellular phone concerning the present invention.

A cellular phone will be explained as an example of the apparatus. FIG. 15 is a diagram showing the cellular phone ex115 using the video encoder and the video decoder explained in the above-mentioned embodiments. The cellular phone ex115 has an antenna ex201 for communicating with the cell site ex110 via radio waves, a camera unit ex203 capable of shooting moving and still pictures such as a CCD camera, a display unit ex202 such as a liquid crystal display for displaying the data obtained by decoding pictures and the like shot by the camera unit ex203 and received by the antenna ex201, a body unit including a set of operation keys ex204, a voice output unit ex208 such as a speaker for outputting voices, a voice input unit 205 such as a microphone for inputting voices, a storage medium ex207 for storing coded or decoded data such as data of moving or still pictures shot by the camera, data of received e-mail and data of moving or still pictures, and a slot unit ex206 operable to attach the storage medium ex207 to the cellular phone ex115. The storage medium ex207 is equipped with a flash memory element, a kind of Electrically Erasable and Programmable Read Only Memory (EEPROM) that is an electrically erasable and rewritable nonvolatile memory, in a plastic case such as SD cards.

Next, the cellular phone ex115 will be explained with reference to FIG. 16. In the cellular phone ex115, a main control unit ex311, which is operable to perform centralized control on each unit of the body unit including the display unit ex202 and operation keys ex204, is connected to a power supply circuit unit ex310, an operation input control unit ex304, a picture coding unit ex312, a camera interface unit ex303, a Liquid Crystal Display (LCD) control unit ex302, a picture decoding unit ex309, a demultiplexing unit ex308, a recording and reproducing unit ex307, a modem circuit unit ex306 and a voice processing unit ex305 to each other via a synchronous bus ex313.

When a call-end key or a power key is turned ON by a user's operation, the power supply circuit unit ex310 supplies respective components with power from a battery pack so as to activate the digital cellular phone with a camera ex115 for making it into a ready state.

In the cell phone ex115, the voice processing unit ex305 converts the voice signals received by the voice input unit ex205 in conversation mode into digital voice data under the control of the main control unit ex311 including a CPU, a ROM and a RAM, the modem circuit unit ex306 operable to perform spread spectrum processing of the digital voice data, and the communication circuit unit ex301 operable to perform digital-to-analog conversion and frequency transform of the data so as to transmit it via the antenna ex201. Also, in the cellular phone ex115, the communication circuit unit ex301 amplifies the data received by the antenna ex201 in conversation mode and performs frequency transform and analog-to-digital conversion for the data, the modem circuit unit ex306 performs inverse spread spectrum processing of the data, and the voice processing unit ex305 converts it into analog voice data so as to output it via the voice output unit ex208.

Furthermore, when transmitting e-mail in data communication mode, the text data of the e-mail inputted by operating the operation keys ex204 on the body unit is sent out to the main control unit ex311 via the operation input control unit ex304. In the main control unit ex311, after the modem circuit unit ex306 performs spread spectrum processing of the text data and the communication circuit unit ex301 performs digital-to-analog conversion and frequency transform for it, the data is transmitted to the cell site ex110 via the antenna ex201.

When picture data is transmitted in data communication mode, the moving picture data shot by the camera unit ex203 is supplied to the picture coding unit ex312 via the camera interface unit ex303. When the picture data is not transmitted, it is also possible to display the picture data shot by the camera unit ex203 directly on the display unit 202 via the camera interface unit ex303 and the LCD control unit ex302.

The picture coding unit ex312, which includes the picture encoder as explained in the present invention, compresses and codes the picture data supplied from the camera unit ex203 using the coding method used for the video encoder as shown in the above-mentioned embodiments so as to transform it into coded picture data, and sends it out to the demultiplexing unit ex308. At this time, the cellular phone ex115 sends out the voices received by the voice input unit ex205 during shooting by the camera unit ex203 to the demultiplexing unit ex308 as digital voice data via the voice processing unit ex305.

The demultiplexing unit ex308 multiplexes the coded picture data supplied from the picture coding unit ex312 and the voice data supplied from the voice processing unit ex305 using a predetermined method, the modem circuit unit ex306 performs spread spectrum processing on the multiplexed data obtained as a result of the multiplexing, and the communication circuit unit ex301 performs digital-to-analog conversion and frequency transform of the data for transmitting via the antenna ex201.

As for receiving data of a moving picture file which is linked to a Web page or the like in data communication mode, the modem circuit unit ex306 performs spread spectrum processing of the data received from the cell site ex110 via the antenna ex201, and sends out the multiplexed data obtained as a result of the processing to the demultiplexing unit ex308.

In order to decode the multiplexed data received via the antenna ex201, the demultiplexing unit ex308 separates the multiplexed data into a bit stream of picture data and a bit stream of voice data, and supplies the current coded picture data to the picture decoding unit ex309 and the current voice data to the voice processing unit ex305 respectively via the synchronous bus ex313.

Next, the picture decoding unit ex309, which includes the video decoder as explained in the above invention, decodes the bit stream of picture data using the decoding method corresponding to the coding method as shown in the above-mentioned embodiments to generate reproduced moving picture data, and supplies this data to the display unit ex202 via the LCD control unit ex302, and thus the moving picture data included in a moving picture file linked to a Web page, for instance, is displayed. At the same time, the voice processing unit ex305 converts the voice data into analog voice data, and supplies this data to the voice output unit ex208, and thus voice data included in a moving picture file linked to a Web page, for instance, is reproduced.

Figure 17:
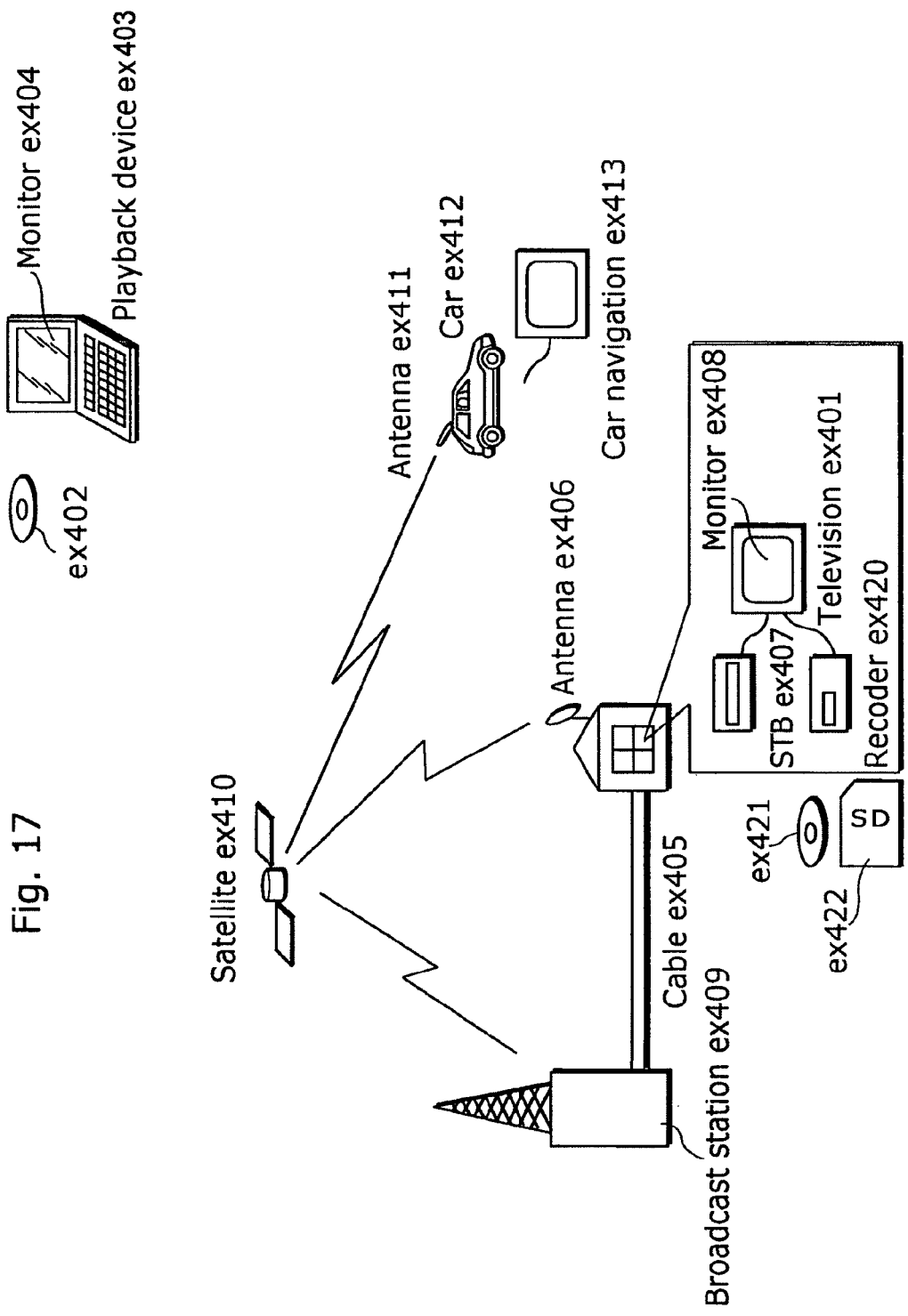
FIG. 17 is a diagram showing the configuration of the system for digital broadcasting concerning the present invention.

The present invention is not limited to the above-mentioned system, and at least either the video encoder or the video decoder in the above-mentioned embodiments can be incorporated into a digital broadcasting system as shown in FIG. 17. Such ground-based or satellite digital broadcasting has been in the news lately. More specifically, a bit stream of video information is transmitted from a broadcast station ex409 to a communication or a broadcast satellite ex410 via radio waves. Upon receipt of it, the broadcast satellite ex410 transmits radio waves for broadcasting, a home-use antenna ex406 with a satellite broadcast reception function receives the radio waves, and a television (receiver) ex401, a set top box (STB) ex407 or the like decodes and reproduce the bit stream. The video decoder as shown in the above-mentioned embodiments can be implemented in the reproduction apparatus ex403 for reading off and decoding the bit stream recorded on a storage medium ex402 that is a recording medium such as a CD and a DVD. In this case, the reproduced video signals are displayed on a monitor ex404. It is also conceived to implement the video decoder in the set top box ex407 connected to a cable ex405 for a cable television or the antenna ex406 for satellite and/or ground-based broadcasting so as to reproduce them on a monitor ex408 of the television. The video encoder may be incorporated into the television, in stead of in the set top box. Or, a car ex412 having an antenna ex411 can receive signals from the satellite ex410, the cell site ex107 or the like for reproducing moving pictures on a display apparatus such as a car navigation system ex413.

Furthermore, the video encoder shown in the above-mentioned embodiments can code picture signals for recording on a recording medium. As a concrete example, there is a recorder ex420 such as a DVD recorder for recording picture signals on a DVD disc ex421 and a disc recorder for recording them on a hard disc. They can be recorded on an SD card ex422. If the recorder ex420 includes the video decoder shown in the above-mentioned embodiment, the picture signals recorded on the DVD disc ex421 or the SD card ex422 can be reproduced for display on the monitor ex408.

Figure 16:
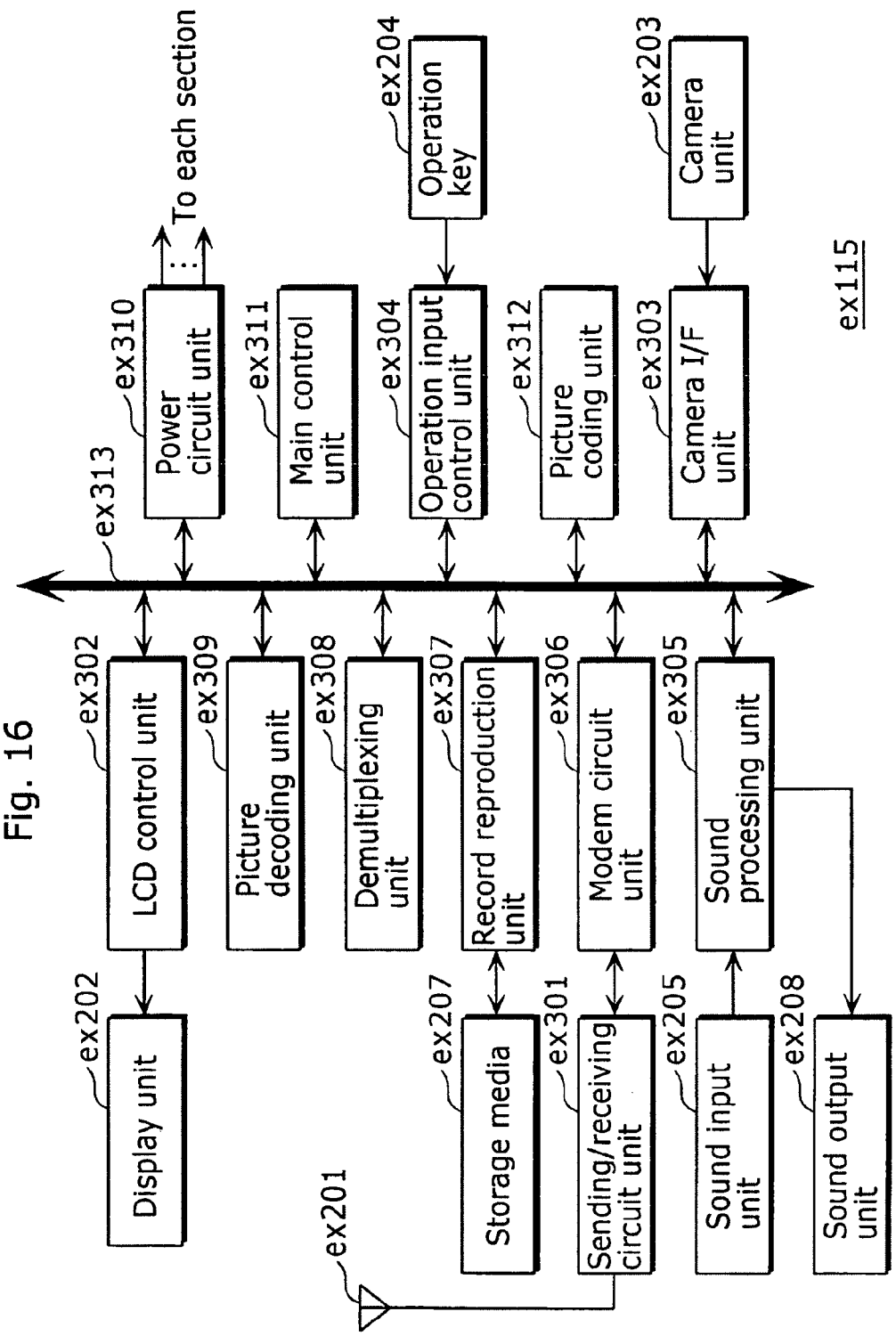
FIG. 16 is a block diagram showing the structure of the cellular phone.

Note that a conceivable configuration of the car navigation system ex413 is the configuration obtained by eliminating the camera unit ex203, the camera interface unit ex303 and the picture coding unit ex312 from existing components in FIG. 16. The same goes for the computer ex111, the television (receiver) ex401 and the like.

In addition, three types of implementations can be conceived for a terminal such as the above-mentioned cell phone ex114, a sending/receiving terminal implemented with both an encoder and a decoder, a sending terminal implemented with an encoder only, and a receiving terminal implemented with a decoder only.

As described above, it is possible to use the video encoder or the video decoder in the above-mentioned embodiments in any of the above-mentioned apparatuses and systems, and by using this method, the effects explained in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

INDUSTRIAL APPLICABILITY

The moving picture coding apparatus, a moving picture decoding apparatus and a memory management device concerning the present invention can be used as a video encoder and a video decoder that are realized by software executed using a electric circuit such as an LSI or a computer. For example, they are useful as a video encoder and a video decoder equipped with computers, PDAs, digital broadcast sending devices, cellular phones and the like which are used for coding moving pictures, decoding and reproducing the coded moving pictures.

The invention claimed is:

1. An apparatus comprising:
   a memory having one or more memory areas, each memory area being capable of storing a first field data, a second field data, or both of the first field data and the second field data; and
   a memory management unit operable to manage a state of each memory area, the state being a data storage prohibition state or a data storage allowance state,
   wherein, when the first field data is reference picture data and is stored in one memory area in the data storage allowance state, said memory management unit
   (i) allows the second field data to be stored in the one memory area into which the first field data is stored when each of the first field data and the second field data constitute a part of the same frame and the second field data is reference picture data, and sets "used" to a flag which corresponds to the one memory area, and
   (ii) prohibits the second field data from being stored in the one memory area into which the first field data is stored and allows the second field data to be stored in a memory area other than the one memory area when the first field data and the second field data do not constitute a part of the same frame and the second field data is reference picture data, and sets "used" to a flag which corresponds to the memory area other than the one memory area, and
   wherein, if each of the first field data and the second field data constitute a part of the same frame, and the second field data is not reference picture data, the memory management unit prohibits the second field data from being stored in the one memory area into which the first field data is stored.

2. A method comprising:
   a storage step of storing data in a memory having one or more memory areas, each memory area being capable of storing a first field data, a second field data, or both of the first field data and the second field data; and
   a memory management step of managing, using a memory management unit, a state of each memory area, the state being a data storage prohibition state or a data storage allowance state,
   wherein, when the first field data is reference picture data and is stored in one memory area in the data storage allowance state, said memory management step
   (i) allows the second field data to be stored in the one memory area into which the first field data is stored when each of the first field data and the second field data constitute a part of the same frame and the second field data is reference picture data, and sets "used" to a flag which corresponds to the one memory area, and
   (ii) prohibits the second field data from being stored in the one memory area into which the first field data is stored and allows the second field data to be stored in a memory area other than the one memory area when the first field data and the second field data do not constitute a part of the same frame and the second field data is reference picture data, and sets "used" to a flag which corresponds to the memory area other than the one memory area, and
   wherein, if each of the first field data and the second field data constitute a part of the same frame, and the second field data is not reference picture data, the memory management step prohibits the second field data from being stored in the one memory area into which the first field data is stored.

* * * * *